United States Patent [19]

Shackle et al.

[11] Patent Number: 4,532,183

[45] Date of Patent: Jul. 30, 1985

[54] METHOD FOR PRODUCING MICROCAPSULES BY INTERFACIAL PHOTOPOLYMERIZATION AND MICROCAPSULES FORMED THEREBY

[75] Inventors: Dale R. Shackle, Chillicothe; Michael J. Cousin, Ashville; Gary D. Pack, Waverly, all of Ohio

[73] Assignee: The Mead Corporation, Dayton, Ohio

[21] Appl. No.: 541,409

[22] Filed: Oct. 13, 1983

[51] Int. Cl.$^3$ .......................... B01J 13/02; B32B 27/16
[52] U.S. Cl. ................... 428/402.22; 264/4.7; 346/215; 424/33; 427/54.1
[58] Field of Search .................. 264/4.7; 428/402.21, 428/402.22; 424/33; 427/54.1

[56] References Cited

U.S. PATENT DOCUMENTS

| | | | |
|---|---|---|---|
| 2,969,330 | 1/1961 | Brynko | 264/4.7 X |
| 2,969,331 | 1/1961 | Brynko et al. | 264/4.7 X |
| 4,021,364 | 5/1977 | Speiser et al. | 428/402.22 |
| 4,075,134 | 2/1978 | Morehouse, Jr. et al. | 524/460 |
| 4,138,362 | 2/1979 | Vassiliades et al. | 428/402.21 |
| 4,228,216 | 10/1980 | Austin et al. | 264/4.7 X |
| 4,269,821 | 5/1981 | Kreuter et al. | 424/19 |
| 4,321,117 | 3/1982 | Kaetsu et al. | 424/33 X |

FOREIGN PATENT DOCUMENTS

| | | | |
|---|---|---|---|
| 0038884 | 4/1974 | Japan | 264/4.7 |
| 52-140479 | 11/1977 | Japan . | |

*Primary Examiner*—Richard D. Lovering
*Attorney, Agent, or Firm*—Biebel, French & Nauman

[57] ABSTRACT

A method for producing microcapsules by interfacial photopolymerization is disclosed wherein a wall-forming monomer is present in both the continuous and the discontinuous phases of a dispersed system, at least one of the phases contains a photoinitiator; polymeric capsule walls which ensheath discrete droplets constituting the discontinuous phase are formed by photopolymerization; in accordance with one embodiment, the discontinuous phase is an oil and a polyfunctional isocyanate prepolymer is added to the discontinuous oil phase as an emulsion stabilizer to enhance wall formation.

12 Claims, No Drawings

METHOD FOR PRODUCING MICROCAPSULES BY INTERFACIAL PHOTOPOLYMERIZATION AND MICROCAPSULES FORMED THEREBY

BACKGROUND OF THE INVENTION

The present invention relates to a method for producing microcapsules and, more particularly, to a method wherein polymeric capsule walls are formed by interfacial photopolymerization.

The formation of capsules consisting of a nucleus around which a shell-like coating of a polymeric or high molecular weight material is deposited is well known in the art. One of the most common methods for forming microcapsules is "complex coacervation" wherein two oppositely charged colloids, such as gelatin and gum arabic, are dispersed under carefully controlled conditions of pH and temperature to form a liquid wall around dispersed oil droplets and the liquid wall is subsequently hardened by physical and/or chemical action. See, for example, U.S. Pat. No. 2,800,457 to Green et al.

Various methods are also known for forming fluid-containing microcapsules by polymerization. For example, processes are known wherein fluid-containing microcapsules are prepared by dispersing a solution of a monomer and an oil in a non-compatible liquid to form droplets and, thereafter, the monomer is polymerized in the dispersed droplets to form a solid polymer capsule wall around each of the monomer droplets.

Processes are also known wherein the reactants forming the microcapsule walls are present in both the continuous and discontinuous phases and the walls are formed by an interfacial reaction. See, for example, U.S. Pat. No. 4,075,134 to Morehouse and U.S. Pat. No. 4,138,362 to Vassiliades et al. Urea-formaldehyde capsules are conventionally formed by sequentially adding urea and formaldehyde to an oil-in-water dispersion under conditions designed to provide a controlled reaction of the urea and formaldehyde which generates a polymer which encapsulates the internal phase. See, for example, U.S. Pat. No. 3,796,669 to Kiritani et al.

The formation of polymeric microcapsules by thermal polymerization and photopolymerization are also known. U.S. Pat. Nos. 2,969,330 and 2,969,331 to Brynko et al disclose a process for forming oil-containing microcapsules by thermal polymerization in which a polymerizable monomer is dissolved in an oil in which the polymer is not soluble and the solution is dispersed in an aqueous medium. The capsule walls are formed by introducing a polymerization catalyst into the aqueous dispersion while heating whereupon the monomer present in each oil droplet polymerizes and forms a shell-like structure which encapsulates the oil.

Japanese Kokai No. 52-140479 (1977) to Kansai Paint teaches a process for the production of water-containing microcapsules wherein an aqueous solution is dispersed in an oil-based photosensitive liquid composition including a photoinitiator, a nonionic surfactant, and an unsaturated compound to produce a water-in-oil emulsion. This emulsion is converted to a water-in-oil-in-water emulsion by the addition of an aqueous solution of a nonionic surfactant. By exposing the latter emulsion to the appropriate radiation, the oily interface is crosslinked to form the capsules. A related process for forming microcapsules by photocrosslinking the capsule wall is disclosed in Japanese Kokai No. 53-22581 (1978).

U.S. Pat. No. 4,021,364 to Speiser et al teaches a procedure for producing microcapsules of small diameter by the steps of dissolving a polymerizable compound in water together with the material to be encapsulated, dispersing this material in a hydrophobic liquid containing a surface active agent which results in the formation of micelles containing the monomer, and inducing polymerization by irradiation.

In order to produce microcapsules by coacervation or polymerization and obtain microcapsules having the desired size, impermeability, and strength characteristics on a uniform basis, each stage of the encapsulation process must be carefully controlled. Due to the large number of steps typically involved in controlling these reactions and the sensitivity to reaction conditions such as pH, concentration and temperature, prior encapsulation processes have not been entirely satisfactory and efforts have been undertaken to develop simplified and less sensitive procedures. While processes involving photopolymerization are known, for various reasons they have not been adopted for commercial applications. Consequently, there is still a need for a simplified method for producing microcapsules.

SUMMARY OF THE INVENTION

The present invention provides a method for producing microcapsules in which the capsule walls are formed by a process which is herein referred to as "interfacial photopolymerization." The method of the present invention is advantageous because it is easily controlled and it involves substantially fewer steps than previous methods. The controlled reagent additions and the temperature and pH adjustments which characterize prior encapsulation processes are avoided in the present invention. By simply controlling irradiation conditions and monomer concentration, polymerization and capsule wall formation can be controlled effectively.

In accordance with the present invention, microcapsules are formed by a method which comprises forming a dispersed system which includes a liquid vehicle as a continuous first phase and a plurality of discrete liquid capsule core entities dispersed in said liquid vehicle as a discontinuous second phase, the first phase having dissolved therein a first wall-forming polymerizable monomer and the second phase having dissolved therein a second wall-forming polymerizable monomer. At least one of the first and second phases contains a photoinitiator. In accordance with the invention, capsule walls are formed by irradiating the dispersed system with a radiation source suitable for inducing polymerization of the first and second monomers such that a polymeric wall forms around each of the discrete liquid capsule core entities constituting the discontinuous phase.

The monomers used in the present invention are typically ethylenically unsaturated compounds, i.e., compounds having at least one terminal ethylene group. Since the monomers must be soluble in the phase in which they are incorporated, the monomers used in the aqueous phase contain a polar solubilizing group such as a hydroxyl group. It is desirable to use an emulsion stabilizer in the dispersed system to facilitate formation of the polymer wall. A preferred stabilizer is a polyfunctional isocyanate prepolymer.

The method of the present invention can be carried out on a batch or continuous basis. A continuous thin film reactor can be used wherein the dispersed system is allowed to flow, as a thin film, over the walls of a chamber irradiated by the radiation source whereby the microcapsule walls are formed.

In accordance with one set of embodiments of the present invention, the continuous phase is water or an aqueous based liquid vehicle and the discontinuous phase is an oil. These embodiments are particularly useful in forming microcapsules useful in the manufacture of carbonless paper wherein the oil phase contains a chromogenic material such as a color precursor.

The method of the present invention can also be used to encapsulate aqueous media containing water soluble active agents such as pharmaceuticals using an aqueous discontinuous phase and a hydrophobic continuous phase.

DETAILED DESCRIPTION OF THE INVENTION

In accordance with the present invention, microcapsules are formed by interfacial photopolymerization of capsule wall-forming monomers present in both the continuous and discontinuous phases.

The monomers must be sufficiently soluble in the phase in which they are incorporated to be capable of forming capsule walls having physical characteristics suitable for the desired application of the capsules. Oil soluble monomers suitable for use in the oil phase (whether it be the continuous or discontinuous phase) are typically ethylenically unsaturated compounds and, more particularly, polyethylenically unsaturated compounds. Representative examples of these monomers include acrylic acid, methacrylic acid, acrylate esters such as methyl and ethyl acrylate, methacrylate esters such as methyl and ethyl methacrylate, and acrylic and methacrylic esters of polyhydric alcohols such as trimethylolpropane trimethacrylate, trimethylolpropane triacrylate, etc.

The monomers useful in the aqueous phase are water soluble polymerizable monomers and are typified by ethylenically unsaturated compounds having a polar solubilizing substituent such as a carboxyl group, a hydroxyl group, an amino group or the like, which imparts adequate water solubility to the monomer such that the monomer can be added to the aqueous phase of the dispersed system in amounts herein specified as suitable for producing desirable wall characteristics. Generally these compounds are monofunctional compounds, i.e., they contain a single ethylenically unsaturated group because polyethylenically unsaturated compounds tend not to be sufficiently water soluble. Representative examples of useful water soluble monomers are hydroxyethyl methacrylate (HEMA), hydroxymethyl methacrylate, hydroxymethyl acrylate, hydroxyethyl acrylate, and the like.

The amount in which the monomers are employed will vary depending upon whether they are used in the continuous or the discontinuous phase and the properties, such as thickness, that are desired in the capsule wall. The monomers are usually employed in the continuous phase in an amount of approximately 1 to 30% by weight based on the weight of the continuous phase solvent and preferably about 2 to 15% by weight. In the discontinuous phase, the monomer is usually present in an amount of about 5 to 45% by weight based on the weight of the solvent and preferably 10 to 40% by weight.

A photoinitiator is added to the dispersed system in order to initiate polymerization. The photoinitiator can be added to the discontinuous or the continuous phase.

In encapsulating oils, the photoinitiator is preferably added to the discontinuous phase so that in the event any of the polymer that is formed is not tied up in the capsule wall, it will be confined to the inside of the capsules.

Substantially any conventional photoinitiator can be used in the present invention. The photoinitiator must be soluble in the phase in which it is incorporated. Typical examples of useful oil soluble photoinitiators are Michler's ketone, benzophenone, benzoin methyl ether, bis-4,4'-(dimethylaminobenzophenone), etc. These compounds can be used alone or in combination to improve the polymerization reaction obtained with a particular radiation source. One example of a useful water soluble photoinitiator is 4-benzoyl-N,N, N-trimethylbenzenemethanaminium chloride.

The amount of the photoinitiator is not particularly critical provided it is sufficient to initiate polymerization of the monomer in the continuous and discontinuous phases. The speed with which the monomers polymerize and cure can be directly affected by the quantity of initiator used. The photoinitiators are usually employed in an amount of about 1 to 30% by weight based on the weight of the monomers and preferably 2 to 15% by weight.

In the preferred embodiments of the present invention emulsification aids and/or protective colloids are used to stabilize the emulsion and obtain more uniform capsule size. Such aids may be added to the continuous and/or discontinuous phase and include such polyelectrolytes as gum arabic, isobutylene-maleic anhydride copolymer, ethylene-maleic anhydride copolymer, polyvinyl alcohol and the like. Other examples of potentially useful emulsion stabilizers are disclosed in U.S. Pat. No. 4,001,140 to Foris et al.

In accordance with the most preferred embodiments of the present invention, a polyfunctional isocyanate prepolymer is added to the oil phase of an oil-in-water system to enhance polymer wall formation. A typical example of a useful polyisocyanate prepolymer is the reaction product of a polyhydric aliphatic alcohol having 2 to 6 carbon atoms in the main chain and 2 to 4 hydroxyl groups and an aromatic, aliphatic or cycloaliphatic polyisocyanate typically having 4 to 6 carbon atoms in the main chain and 2 or 3 isocyanate groups. A trimethylol propane-toluene diisocyanate adduct useful in the present invention is sold under the trade name Niax SF-50 by Union Carbide Corporation. It is believed that these compounds react with water present in the dispersed system to produce polyurea which tends to further stabilize the emulsion. Other examples of potentially useful polyisocyanate prepolymers include both polyfunctional aromatic and aliphatic polyisocyanates such as Mobay Chemical Corporation's Mondur CB-75 and Desmodur N-100. These compounds are employed in an amount of about 0.04 to 1.50% of the weight of the discontinuous phase and preferably 0.1 to 0.8% by weight.

The dispersed system from which capsules are formed can be produced in a conventional manner, for example, by shaking, stirring, or using a colloid mill. Dispersion conditions, such as the volumetric ratio of the continuous to the discontinuous phase and the degree of agitation, are adjusted to produce microcapsules of the desired particle size and are not particularly limited. Usually the volumetric ratio of the continuous to the discontinuous phase falls in the range of about 10:1 to 1:1.

Since the method of the present invention does not rely on phase separation or coacervation to form the capsule walls, temperature and pH are not critical. It is convenient to carry out the present invention at temperatures of 1° to 99° C. with room temperature being completely satisfactory.

The method of the present invention is particularly useful in forming microcapsules ranging from about 5 to 30 microns in diameter. In accordance with one embodiment of the present invention, irradiation of the monomer-containing dispersion is conducted on a continuous basis using a thin film reactor designed to polymerize the monomers as the dispersed system flows along the walls of a chamber or film support in the presence of the irradiation source. In accordance with one embodiment of the invention, a cylindrical thin film reactor is used in which the dispersed system flows downwardly along the inside walls of a cylindrical vessel in which an ultraviolet light source such as a fluorescent tube is centrally positioned. Alternatively, where a more intense exposure is desired, a plurality of irradiation sources can be positioned outside of a cylindrical chamber along which the dispersed system flows. The flow rate of the dispersed system and the intensity of the irradiation source are adjusted to achieve wall formation.

The radiation source used depends on the photoinitiator-monomer system that is employed. Substantially any form of electromagnetic radiation can be used including ultraviolet, infrared and visible radiation. Applications are also envisioned, however, in which X-ray or gamma radiation may be used. The intensity of the energy source can be varied to effect a corresponding change in the rate of wall formation. In the selection of the irradiation source and intensity, one must take into consideration the effect of the irradiation on the encapsulated agent. For instance, undesirable color formation may occur to encapsulated leuco dyes such as Crystal Violet lactone during periods of long and/or high intensity exposure to certain radiations.

The method of the present invention is particularly useful in forming microcapsules for the manufacture of carbonless paper in which an oil containing a color precursor is encapsulated in a polymeric wall-former. However, the present invention is also useful in other areas, including in the encapsulation of aqueous liquids including pharmaceuticals, agricultural chemicals, etc.

In forming microcapsules for use in carbonless paper, the continuous phase is usually made up of water, a water soluble monomer, and a protective colloid such as gum arabic, and the discontinuous phase is an oil solution of a color former, an oil soluble monomer and, preferably a polyisocyanate prepolymer. Diluent oils such as castor oil, mineral oil, and certain alkylated biphenyls, such as monoisopropylbiphenyl, may also be present in the discontinuous phase.

The present invention is more fully illustrated by the following non-limiting example:

EXAMPLE 1

7.2 g of crystal violet lactone (CVL) was dissolved in 262 g of monoisopropylbiphenyl (MIPB) over 5 min. at 80° C. and mixed with 77.3 g of a 2.9% solution of Michler's ketone and benzophenone (1:1 ratio) in trimethylolpropanetriacrylate (TMPTA). The mixture was allowed to come to room temperature before 0.5 g of a polyisocyanate prepolymer prepared from toluene diisocyanate and trimethylopropane (Niax SF-50, Union Carbide Corp.) was added. This mixture was subsequently emulsified in a Waring blender for approximately 2.0 minutes at the low speed setting with an aqueous mixture containing 93.7 g of a 21% solution of isobutylene maleic anhydride copolymer (Isobam), 187.5 g of a 10% gum arabic solution, 37.5 g of hydroxyethylmethacrylate (HEMA), and 200 g of distilled water. The emulsion was diluted with 550 g of additional distilled water and placed in a 5-necked 3-liter round bottom flask equipped with a thermometer, mechanical mixer, U.V. light source (150 watt), nitrogen gas inlet and outlet ports as well as a sample port. The U.V. light was turned on and the encapsulation allowed to proceed. After 2 hours, the mononuclear capsules displayed an average size of 12.5 microns.

A drop of the capsule dispersion was placed on one end of a commercial carbonless copy paper developer sheet beside a drop of unexposed emulsion. Both drops were each diluted with a drop of distilled water. The treated end of the sheet was elevated to cause the drops to run down the incline to the bottom. After drying in an oven for several minutes at 65° C., a pronounced blue track was apparent where the emulsion had been placed in contrast to the lack of image development for the area treated with the capsule dispersion. However, an image could be formed by applying pressure across the track using the non-writing end of a pen.

A carbonless copy paper was prepared by applying a mixture of 7 parts by weight microcapsule dispersion, 20 parts starch stilts, and 10 parts starch binder on paper using #12 Meyer bar. A handwritten image copy was formed on a conventional carbonless developer sheet using the experimental imaging sheet.

Having described the invention in detail and by reference to specific embodiments thereof, it will be apparent that numerous variations and modifications are possible without departing from the spirit or scope of the invention as defined by the following claims.

What is claimed is:

1. A method for producing microcapsules which comprises:
    forming a dispersed system which includes an aqueous liquid vehicle as a continuous first phase, a plurality of discrete, oily capsule core entities dispersed in said liquid vehicle constituting a discontinuous second phase, said first phase having a first polymerizable monomer dissolved therein, and said second phase having a second polymerizable monomer dissolved therein and containing a polyisocyanate prepolymer as a emulsion stabilizing agent, and a photoinitiator provided in at least one of said first and second phases; said first monomer being a water soluble ethylenically unsaturated compound and said second monomer being an oil soluble ethylenically unsaturated compound; and
    irradiating said dispersed system with a radiation source capable of inducing polymerization of said first and second monomers such that said first and second monomers react and form a polymeric wall around said discrete capsule core entities.

2. The method of claim 1 wherein said photoinitiator is present in said second, discontinuous phase.

3. The method of claim 1 wherein said polyisocyanate prepolymer is the reaction product of trimethylolpropane and toluene diisocyanate.

4. The method of claim 3 wherein said continuous phase additionally includes an emulsion stabilizer.

5. The method of claim 4 wherein said emulsion stabilizer in said continuous phase is a water soluble polyelectrolyte.

6. The method of claim 5 wherein said first monomer is hydroxyethyl methacrylate and said second monomer is trimethylolpropane trimethacrylate.

7. The method of claim 5 wherein said water soluble polyelectrolyte is selected from the group consisting of gum arabic, isobutylene-maleic anhydride copolymer, polyvinyl alcohol, and ethylene-maleic anhydride copolymer and combinations thereof.

8. The method of claim 7 wherein said discontinuous second phase comprises an oil having dissolved therein a color precursor.

9. The method of claim 1 wherein said irradiating includes flowing said dispersed system along the walls of a thin film reactor while exposing it to a suitable radiation source.

10. The method of claim 9 wherein said irradiation source is centrally located within said thin film reactor.

11. The method of claim 9 wherein said irradiation source is positioned at the periphery of said thin film reactor.

12. Microcapsules formed by the method of claim 1.

* * * * *